(12) United States Patent
Bloch et al.

(10) Patent No.: US 9,607,655 B2
(45) Date of Patent: Mar. 28, 2017

(54) SYSTEM AND METHOD FOR SEAMLESS MULTIMEDIA ASSEMBLY

(75) Inventors: Jonathan Bloch, Tel Aviv (IL); Barak Feldman, Tel Aviv (IL); Tal Zubalsky, Tel Aviv (IL); Kfir Y. Rotbard, Ramat Hasharon (IL); Dmitry Burstein, Ramat Gan (IL)

(73) Assignee: JBF Interlude 2009 LTD (IL)

( * ) Notice: Subject to any disclaimer, the term of this patent is extended or adjusted under 35 U.S.C. 154(b) by 433 days.

(21) Appl. No.: 13/033,916

(22) Filed: Feb. 24, 2011

(65) Prior Publication Data

US 2011/0200116 A1    Aug. 18, 2011

Related U.S. Application Data

(63) Continuation-in-part of application No. 12/706,721, filed on Feb. 17, 2010.

(51) Int. Cl.
*G06F 15/16* (2006.01)
*G06F 17/00* (2006.01)
(Continued)

(52) U.S. Cl.
CPC ........... *G11B 27/10* (2013.01); *G10H 1/0025* (2013.01); *G11B 27/034* (2013.01);
(Continued)

(58) Field of Classification Search
CPC ... G06F 3/048; G06F 17/30; H04N 21/23406; H04N 21/2368; H04N 21/4307;
(Continued)

(56) References Cited

U.S. PATENT DOCUMENTS

| 5,568,602 A | 10/1996 | Callahan et al. |
| 5,607,356 A | 3/1997 | Schwartz |

(Continued)

FOREIGN PATENT DOCUMENTS

| DE | 10053720 A1 | 4/2002 |
| EP | 1033157 A2 | 9/2000 |

(Continued)

OTHER PUBLICATIONS

International Search Report for International Application PCT/IL2010/000362 mailed Aug. 25, 2010.

(Continued)

*Primary Examiner* — Stephen Hong
*Assistant Examiner* — Ahamed I Nazar
(74) *Attorney, Agent, or Firm* — Goodwin Procter LLP

(57) ABSTRACT

Systems and methods are provided for seamless assembly of video/audio segments. To achieve such seamless assembly during streaming/online progressive download of media, a second segment is downloaded to a client during the presentation of a first segment. The first segment is then attached to the beginning of the second segment, where no jitter or gap results with the transition point either in the video or audio portion of the segments. Hence, the merged segments are presented as a seamless assembly of video/audio segments, where the user is "unaware" that the merged segments are the result of two separate or different segments. To effectuate such gapless assembly of segments, a gapless media file is created for encoding the video and audio segments using a gapless audio encoding scheme, such as Ogg Vorbis, where synchronized, gapless audio tags are interleaved in the video segments.

13 Claims, 14 Drawing Sheets

(51) Int. Cl.
  *G11B 27/10* (2006.01)
  *G10H 1/00* (2006.01)
  *G11B 27/034* (2006.01)
  *G11B 27/036* (2006.01)
  *G11B 27/34* (2006.01)

(52) U.S. Cl.
  CPC ............ *G11B 27/036* (2013.01); *G11B 27/34* (2013.01); *G10H 2210/125* (2013.01)

(58) Field of Classification Search
  CPC ......... H04N 21/4341; H04N 21/44004; H04N 21/238; H04N 21/438; H04N 21/2662; H04N 21/4621; H04N 21/64792; H04L 65/607; H04L 69/04; H04L 69/22; H04L 5/0064; H04L 65/4092; H04L 65/1066
  USPC ...... 375/240, E7.027, E7.076; 715/716, 723; 369/30.23
  See application file for complete search history.

(56) References Cited

U.S. PATENT DOCUMENTS

| | | | |
|---|---|---|---|
| 5,636,036 A | 6/1997 | Ashbey | |
| 5,676,551 A | 10/1997 | Knight et al. | |
| 5,734,862 A | 3/1998 | Kulas | |
| 5,818,435 A | 10/1998 | Kozuka et al. | |
| 6,122,668 A | 9/2000 | Teng et al. | |
| 6,128,712 A | 10/2000 | Hunt et al. | |
| 6,191,780 B1 | 2/2001 | Martin et al. | |
| 6,222,925 B1 | 4/2001 | Shiels et al. | |
| 6,298,482 B1 | 10/2001 | Seidman et al. | |
| 6,728,477 B1 | 4/2004 | Watkins | |
| 6,801,947 B1 * | 10/2004 | Li | H04L 29/06027 348/E5.008 |
| 7,155,676 B2 | 12/2006 | Land et al. | |
| 7,310,784 B1 | 12/2007 | Gottlieb et al. | |
| 7,379,653 B2 | 5/2008 | Yap et al. | |
| 7,444,069 B1 | 10/2008 | Bernsley | |
| 7,627,605 B1 | 12/2009 | Lamere et al. | |
| 7,787,973 B2 * | 8/2010 | Lambert | H04L 65/4076 700/94 |
| 7,917,505 B2 | 3/2011 | van Gent et al. | |
| 8,065,710 B2 | 11/2011 | Malik | |
| 8,190,001 B2 | 5/2012 | Bernsley | |
| 8,276,058 B2 | 9/2012 | Gottlieb et al. | |
| 8,281,355 B1 | 10/2012 | Weaver et al. | |
| 8,600,220 B2 | 12/2013 | Bloch et al. | |
| 8,650,489 B1 | 2/2014 | Baum et al. | |
| 8,860,882 B2 | 10/2014 | Bloch et al. | |
| 8,977,113 B1 | 3/2015 | Rumteen et al. | |
| 9,009,619 B2 | 4/2015 | Bloch et al. | |
| 9,021,537 B2 | 4/2015 | Funge et al. | |
| 9,190,110 B2 | 11/2015 | Bloch | |
| 9,257,148 B2 | 2/2016 | Bloch et al. | |
| 9,271,015 B2 | 2/2016 | Bloch et al. | |
| 2002/0091455 A1 | 7/2002 | Williams | |
| 2002/0105535 A1 | 8/2002 | Wallace et al. | |
| 2002/0106191 A1 | 8/2002 | Betz et al. | |
| 2002/0120456 A1 | 8/2002 | Berg et al. | |
| 2002/0177914 A1 | 11/2002 | Chase | |
| 2003/0159566 A1 | 8/2003 | Sater et al. | |
| 2003/0183064 A1 | 10/2003 | Eugene et al. | |
| 2003/0184598 A1 | 10/2003 | Graham | |
| 2003/0221541 A1 | 12/2003 | Platt | |
| 2004/0138948 A1 * | 7/2004 | Loomis | 705/14 |
| 2004/0172476 A1 * | 9/2004 | Chapweske | 709/231 |
| 2005/0019015 A1 | 1/2005 | Ackley et al. | |
| 2005/0055377 A1 | 3/2005 | Dorey et al. | |
| 2005/0091597 A1 * | 4/2005 | Ackley | 715/716 |
| 2005/0102707 A1 | 5/2005 | Schnitman | |
| 2006/0002895 A1 | 1/2006 | McDonnell et al. | |
| 2006/0028951 A1 * | 2/2006 | Tozun et al. | 369/84 |
| 2006/0064733 A1 | 3/2006 | Norton et al. | |
| 2006/0150072 A1 | 7/2006 | Salvucci | |
| 2006/0155400 A1 | 7/2006 | Loomis | |
| 2006/0200842 A1 | 9/2006 | Chapman et al. | |
| 2006/0224260 A1 | 10/2006 | Hicken et al. | |
| 2007/0003149 A1 | 1/2007 | Nagumo et al. | |
| 2007/0024706 A1 | 2/2007 | Brannon et al. | |
| 2007/0033633 A1 | 2/2007 | Andrews et al. | |
| 2007/0118801 A1 | 5/2007 | Harshbarger et al. | |
| 2007/0157261 A1 | 7/2007 | Steelberg et al. | |
| 2007/0162395 A1 | 7/2007 | Ben-Yaacov et al. | |
| 2007/0239754 A1 | 10/2007 | Schnitman | |
| 2007/0263722 A1 | 11/2007 | Fukuzawa | |
| 2008/0019445 A1 | 1/2008 | Aono et al. | |
| 2008/0021874 A1 | 1/2008 | Dahl et al. | |
| 2008/0022320 A1 | 1/2008 | Ver Steeg | |
| 2008/0086754 A1 | 4/2008 | Chen et al. | |
| 2008/0091721 A1 * | 4/2008 | Harboe | G06F 3/0482 |
| 2008/0092159 A1 | 4/2008 | Dmitriev et al. | |
| 2008/0148152 A1 | 6/2008 | Blinnikka et al. | |
| 2008/0276157 A1 | 11/2008 | Kustka et al. | |
| 2008/0300967 A1 | 12/2008 | Buckley et al. | |
| 2008/0301750 A1 | 12/2008 | Silfvast et al. | |
| 2008/0314232 A1 | 12/2008 | Hansson et al. | |
| 2009/0022015 A1 | 1/2009 | Harrison | |
| 2009/0024923 A1 | 1/2009 | Hartwig et al. | |
| 2009/0055880 A1 | 2/2009 | Batteram et al. | |
| 2009/0063681 A1 | 3/2009 | Ramakrishnan et al. | |
| 2009/0116817 A1 | 5/2009 | Kim et al. | |
| 2009/0199697 A1 * | 8/2009 | Lehtiniemi | G06F 17/30699 84/600 |
| 2009/0228572 A1 | 9/2009 | Wall et al. | |
| 2009/0320075 A1 | 12/2009 | Marko | |
| 2010/0017820 A1 | 1/2010 | Thevathasan et al. | |
| 2010/0042496 A1 | 2/2010 | Wang et al. | |
| 2010/0077290 A1 | 3/2010 | Pueyo | |
| 2010/0146145 A1 | 6/2010 | Tippin et al. | |
| 2010/0153512 A1 | 6/2010 | Balassanian et al. | |
| 2010/0161792 A1 | 6/2010 | Palm et al. | |
| 2010/0167816 A1 * | 7/2010 | Perlman | A63F 13/12 463/30 |
| 2010/0186579 A1 | 7/2010 | Schnitman | |
| 2010/0262336 A1 | 10/2010 | Rivas et al. | |
| 2010/0268361 A1 | 10/2010 | Mantel et al. | |
| 2010/0278509 A1 | 11/2010 | Nagano et al. | |
| 2010/0287033 A1 | 11/2010 | Mathur | |
| 2010/0287475 A1 | 11/2010 | van Zwol et al. | |
| 2010/0293455 A1 | 11/2010 | Bloch | |
| 2010/0332404 A1 | 12/2010 | Valin | |
| 2011/0007797 A1 * | 1/2011 | Palmer | G11B 27/034 375/240.01 |
| 2011/0010742 A1 | 1/2011 | White | |
| 2011/0026898 A1 | 2/2011 | Lussier et al. | |
| 2011/0096225 A1 | 4/2011 | Candelore | |
| 2011/0126106 A1 | 5/2011 | Ben Shaul et al. | |
| 2011/0131493 A1 * | 6/2011 | Dahl | G06F 17/30029 715/716 |
| 2011/0138331 A1 * | 6/2011 | Pugsley et al. | 715/835 |
| 2011/0191684 A1 | 8/2011 | Greenberg | |
| 2011/0197131 A1 | 8/2011 | Duffin et al. | |
| 2011/0200116 A1 | 8/2011 | Bloch et al. | |
| 2011/0202562 A1 | 8/2011 | Bloch et al. | |
| 2011/0246885 A1 | 10/2011 | Pantos et al. | |
| 2011/0252320 A1 | 10/2011 | Arrasvuori et al. | |
| 2011/0264755 A1 | 10/2011 | Salvatore De Villiers | |
| 2012/0004960 A1 * | 1/2012 | Ma | G06Q 30/0241 705/14.4 |
| 2012/0005287 A1 | 1/2012 | Gadel et al. | |
| 2012/0062576 A1 * | 3/2012 | Rosenthal | G09G 5/14 345/522 |
| 2012/0094768 A1 | 4/2012 | McCaddon et al. | |
| 2012/0110620 A1 | 5/2012 | Kilar et al. | |
| 2012/0134646 A1 | 5/2012 | Alexander | |
| 2012/0198412 A1 | 8/2012 | Creighton et al. | |
| 2012/0308206 A1 * | 12/2012 | Kulas | 386/244 |
| 2013/0046847 A1 | 2/2013 | Zavesky et al. | |
| 2013/0054728 A1 | 2/2013 | Amir et al. | |
| 2013/0055321 A1 | 2/2013 | Cline et al. | |
| 2013/0097643 A1 | 4/2013 | Stone et al. | |
| 2013/0188923 A1 | 7/2013 | Hartley et al. | |
| 2013/0259442 A1 | 10/2013 | Bloch et al. | |

(56) References Cited

U.S. PATENT DOCUMENTS

| | | | |
|---|---|---|---|
| 2013/0282917 A1 | 10/2013 | Reznik et al. | |
| 2013/0308926 A1 | 11/2013 | Jang et al. | |
| 2014/0025839 A1* | 1/2014 | Marko | H04H 20/42 709/231 |
| 2014/0040280 A1 | 2/2014 | Slaney et al. | |
| 2014/0078397 A1 | 3/2014 | Bloch et al. | |
| 2014/0082666 A1 | 3/2014 | Bloch et al. | |
| 2014/0129618 A1 | 5/2014 | Panje et al. | |
| 2014/0178051 A1 | 6/2014 | Bloch et al. | |
| 2014/0270680 A1 | 9/2014 | Bloch et al. | |
| 2014/0282013 A1 | 9/2014 | Amijee | |
| 2014/0380167 A1 | 12/2014 | Bloch et al. | |
| 2015/0067723 A1 | 3/2015 | Bloch et al. | |
| 2015/0104155 A1 | 4/2015 | Bloch et al. | |
| 2015/0179224 A1 | 6/2015 | Bloch et al. | |
| 2015/0181301 A1 | 6/2015 | Bloch et al. | |
| 2015/0199116 A1 | 7/2015 | Bloch et al. | |
| 2015/0293675 A1 | 10/2015 | Bloch et al. | |
| 2015/0294685 A1 | 10/2015 | Bloch et al. | |
| 2016/0104513 A1 | 4/2016 | Bloch et al. | |
| 2016/0105724 A1 | 4/2016 | Bloch et al. | |

FOREIGN PATENT DOCUMENTS

| | | |
|---|---|---|
| EP | 2104105 | 9/2009 |
| GB | 2359916 A | 9/2001 |
| GB | 2428329 A | 1/2007 |
| JP | 2008005288 A | 1/2008 |
| WO | WO-00/59224 | 10/2000 |
| WO | WO-2007/062223 | 5/2007 |
| WO | WO-2007/138546 | 12/2007 |
| WO | WO-2008/001350 | 1/2008 |
| WO | WO-2008/057444 | 5/2008 |
| WO | WO-2008052009 A2 | 5/2008 |
| WO | WO-2009/137919 | 11/2009 |

OTHER PUBLICATIONS

Supplemental Search Report for PCT/IL2010/000362 mailed Jun. 28, 2012.
International Search Report for International Patent Application PCT/IL2012/000080 dated Aug. 9, 2012 (4 pages).
International Search Report for International Patent Application PCT/IL2012/000081 dated Jun. 28, 2012 (4 pages).
Labs.byHook: "Ogg Vorbis Encoder for Flash: Alchemy Series Part 1," [Online] Internet Article, Retrieved on Dec. 17, 2012 from the Internet: URL:http://labs.byhook.com/2011/02/15/ogg-vorbis-encoder-for-flash-alchemy-series-part-1/, 2011, (6 pages).
An ffmpeg and SDL Tutorial, "Tutorial 05: Synching Video," Retrieved from internet on Mar. 15, 2013: <http://dranger.com/ffmpeg/tutorial05.html>, (4 pages).
Archos Gen 5 English User Manual Version 3.0, Jul. 26, 2007, pp. 1-81.
Gregor Miller et al. "MiniDiver: A Novel Mobile Media Playback Interface for Rich Video Content on an iPhoneTM", Entertainment Computing A ICEC 2009, Sep. 3, 2009, pp. 98-109.
International Search Report and Written Opinion for International Application PCT/IB2013/001000 mailed Jul. 31, 2013, 12 pages.
Sodagar, I., (2011) "The MPEG-DASH Standard for Multimedia Streaming Over the Internet," *IEEE Multimedia,* IEEE Service Center, New York, NY, vol. 18, No. 4, pp. 62-67.
Supplemental European Search Report for EP13184145 dated Jan. 30, 2014 (6 pages).
Yang, H, et al., "Time Stamp Synchronization in Video Systems," Teletronics Technology Corporation, <http://www.ttcdas.com/products/daus_encoders/pdf/_tech_papers/tp_2010_time_stampvideo_system.pdf>, Abstract, (8 pages).
Barlett, Mitch, "iTunes 11: How to Queue Next Song," Technipages, Oct. 6, 2008, pp. 1-8, retrieved on Dec. 26, 2013 from the internet http://www.technipages.com/itunes-aueue-next-song.html.

* cited by examiner

|  | SEGMENT 1 (502) | SEGMENT 2 CHORUS A (508) | SEGMENT 3 (520) | SEGMENT 4 CHORUS B (538) | SEGMENT 5 (560) |
|---|---|---|---|---|---|
| VARIATION 1 | LONELY BOY (504) | 501 LONELINESS IS SWEET (510) | BOY WATCHES GIRL IN CLASS (522) | SWEET LONELINESS LEADS TO GOOD LOVE (540) | DOGS CURE LONELINESS (562) |
| VARIATION 2 | LONELY GIRL (506) | LONELINESS IS PAINFUL (512) | BOY WATCHES GIRL AT WORK (524) | SWEET LONELINESS LEADS TO TROUBLE (542) | LOVE CURES LONELINESS (564) |
| VARIATION 3 |  | LONELINESS FOLLOWED BY LOVE (514) | BOY THINKS ABOUT GIRL WHO MOVED AWAY (526) | SWEET LONELINESS MAKES LIFE WORTH LIVING (544) | GOOD TO BE A NUN (566) |
| VARIATION 4 |  | LONELINESS BUT DON'T GIVE UP (516) | BOY MAKES UP IMAGINARY GIRL (528) | PAINFUL LONELINESS LEADS TO GOOD LOVE (545) | NOTHING CURES LONELINESS (568) |
| VARIATION 5 |  | LONELINESS SO BECOME A NUN (518) | BOY WATCHES BOY IN CLASS (530) | PAINFUL LONELINESS LEADS TO TROUBLE (546) |  |
| VARIATION 6 |  |  | GIRL DREAMS ABOUT TEACHER (532) | PAINFUL LONELINESS NEVER ENDS (548) |  |
| VARIATION 7 |  |  | GIRL IS EMBARRASSED TO TALK TO BOY (534) | LONELINESS BUT DON'T GIVE UP (516) |  |
| VARIATION 8 |  |  | GIRL FINDS A DOG (536) |  |  |

FIG. 5

SYSTEM AND METHOD FOR SEAMLESS MULTIMEDIA ASSEMBLY

CROSS-REFERENCE TO RELATED PATENT APPLICATIONS

This application is a Continuation-in-part of U.S. application Ser. No. 12/706,721 filed Feb. 17, 2010 incorporated herein by reference in its entirety.

FIELD OF THE INVENTION

The present invention generally relates to seamlessly assembling multimedia content such as audio and video during online progressive downloads of the multimedia content including interactive video.

BACKGROUND OF THE INVENTION

Artists such as singers, film producers, or videographers may record and make available more than one version of a particular composition, or multiple variations of a part of a composition. Such versions may include for example an acoustic version of a song, an electric or synthesized version of the same song, a hip-hop version, a classical version, etc. Similarly, various artists may record and make available their own cover versions of the same song.

It would be advantageous to allow, e.g., other artists, to create a composition that may include certain variations of parts of the original composition, or of parts of variations of similar or different compositions so that versions of the same composition may be recorded and made available for users or consumers to select from, depending on their taste, mood or other preference.

Additionally, conventional systems and methods of assembling multimedia content, such as video, include seamless offline assembly and internet video streaming. Seamless offline assembly of video/audio syncs on a local computer may be performed with video editing software (e.g., Adobe® Premiere®, Avid Media Composer®, etc.). Such software is applied to video/audio syncs that are already downloaded to or resident on, e.g., a computer upon which the software is also executed upon. By rendering several pieces of one or more videos on a linear timeline, the different pieces can be assembled as desired. However, this type of assembly cannot be performed in real-time. In the case of Internet video streaming, a streaming video player has the ability to play videos one after the other, for example, pre-rolls and post rolls. However, such sequential presentation of multiple videos is not achieved in a seamless manner because the transitions between one or more segments of the videos are always apparent as a loading-buffer, hiccup, or a delay in the video, the audio, or both. Hence, conventional systems and methods do not provide a way to seamlessly connect videos in real-time, especially when utilizing multimedia platforms like Adobe® Flash® which utilizes high-quality audio encoding which cannot be seamlessly stitched together.

SUMMARY OF THE INVENTION

One embodiment of the invention relates to a system for seamless media assembly that includes an encoder. The encoder is configured to create first and second gapless media files by interleaving first and second pluralities of gapless audio tags representative of first and second audio streams, with first and second video segments, respectively. Additionally, the system includes a decoder configured to synchronize the first and second audio streams with the first and second video segments, respectively upon receipt of the first and second gapless media files from the encoder. Furthermore, the decoder assembles the first and second gapless media files as a seamlessly continuous media stream for playback.

Another embodiment of the invention relates to a computer-implemented encoding method, where first and second audio streams are analyzed at an encoding device to determine proper division points resulting in first and second pluralities of gapless audio tags. Additionally, the computer-implemented encoding method comprises creating, with the encoding device, first and second gapless media files for seamless assembly by interleaving the first and second pluralities of gapless audio tags representative of the first and second audio streams, with first and second video segments, respectively.

Yet another embodiment of the invention relates to a computer-implemented decoding method, wherein upon receipt of the first and second gapless media files at a decoding device, first and second audio streams are synchronized with first and second video segments, respectively. The first and second gapless media files include first and second pluralities of gapless audio tags representative of the first and second audio streams. Additionally, the first and second gapless media files are assembled as a seamlessly continuous media stream for playback.

It should be understood that the detailed description and specific examples, while indicating preferred embodiments of the present invention, are given by way of illustration and not limitation. Many modifications and changes within the scope of the present invention may be made without departing from the spirit thereof, and the invention includes all such modifications.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

FIG. 5 is a flow diagram of multiple variations of segments of a composition, and possible connections between the variations, in accordance with an embodiment of the invention;

DETAILED DESCRIPTION OF THE PREFERRED EMBODIMENTS

Figure 1:
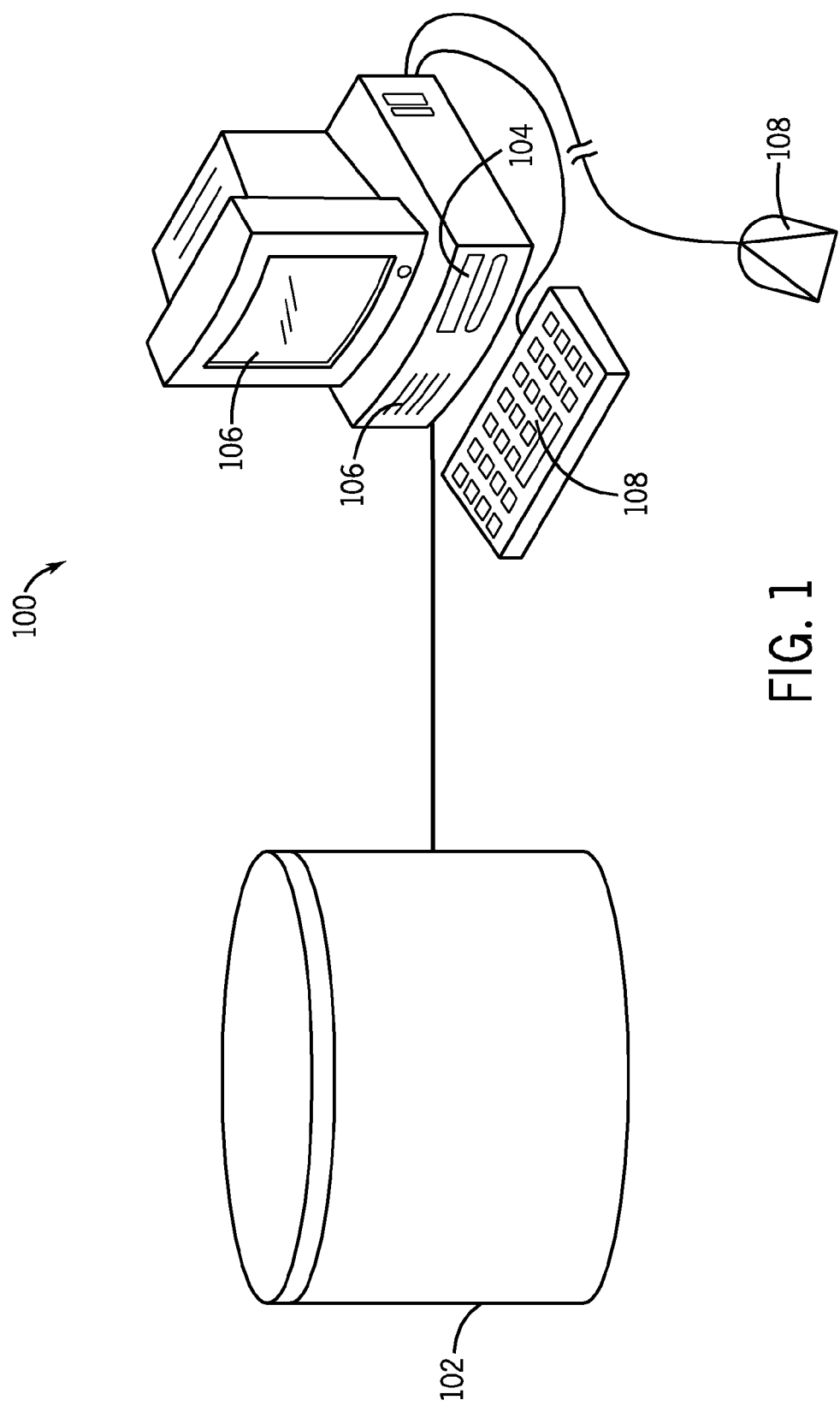
FIG. 1 is a conceptual illustration of a system in accordance with an embodiment the invention.

In the following description, various embodiments of the invention will be described. For purposes of explanation, specific examples are set forth in order to provide a thorough understanding of at least one embodiment of the invention. However, it will also be apparent to one skilled in the art that other embodiments of the invention are not limited to the examples described herein. Furthermore, well-known features may be omitted or simplified in order not to obscure embodiments of the invention described herein.

Unless specifically stated otherwise, as apparent from the following discussions, it is appreciated that throughout the specification, discussions utilizing terms such as "adding," "associating," "selecting," "evaluating," "processing," "computing," "calculating," "determining," "designating," "allocating," or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The processes and functions presented herein are not inherently related to any particular computer, network or other apparatus. Embodiments of the invention described herein are not described with reference to any particular programming language, machine code, etc. It will be appreciated that a variety of programming languages, network systems, protocols or hardware configurations may be used to implement the teachings of the embodiments of the invention as described herein. An embodiment of the invention may be practiced through the execution of instructions that may be stored on an article such as a disc, memory device or other mass data storage article. Such instructions may be for example loaded into one or more processors and executed.

As utilized herein, the terms "composition" or "work", may, in addition to their regular definition, refer to a song, musical opus, video presentation, audio recording, film, movie, advertisement or other collection of audio and or audio plus visual signals that are assembled into a work that has identifiable components. For example, a composition may refer to a song having stanzas and verses, or bars and phrases, where in general, stanzas are linked to or follow verses, and verses are linked to or follow stanzas. The terms "mode" or "version" of a composition may, in addition to its regular definition, refer to a style or identifiable characteristic of a particular recording of a given composition, or a recording made or sung by a particular artist. For example, a given song, video, speech or film may be recorded in an acoustic version, an electric version, a hip-hop version, a jazz version or other versions. The same song or video may be recorded by various artists or combination of artists in their own respective versions. In some embodiments, each of such versions may include all of the components of the particular composition, such as all or most of the stanzas, verses, notes or scenes of the composition.

As utilized herein, a "segment" may in addition to its regular meaning, refer to a pre-defined portion of a work or composition, or an interval of either a defined or undefined period during a work or composition that may be set off with a start time at a certain point during the composition, and/or an end time during the composition, at which point another segment of the composition may begin or at which point a non-segmented portion of the composition may resume. In some embodiments, a segment may refer to a space or blank during a song or composition into which space or blank a variation may be inserted.

As utilized herein, a "progression of a recording" may refer to a scale or measure of the progress of a recording relative to its complete play. For example, a progression may refer to an elapsed time or period of a recording, as such time or period may be initiated from a beginning or end of a recording. In some embodiments, a progression may refer to a point in a series of musical notes, lyrics, images or other known events or markers in each of two or more recordings of the composition. For example, if the notes or lyrics or a musical or audio composition are known, a progression of the recording may include a tracking of the notes played or heard in one or more versions of the recording. A progression may be consistent between two or more versions of a recording such that a point in a progression of a first version may be tracked and associated with a corresponding point on a second version.

As utilized herein, the term "variation" may, in addition to its regular meaning, mean a portion of a song, movie, clip, or advertisement that may be inserted into or combined with one or more other portions of a song, movie or clip at a predefined point in the song, movie or clip. A variation may include lyrics, music, images or music that are different from the original song, movie or clip into which the variation is being added, and that are different from the other variations. A variation may be differentiated from a version in that while a version will generally be or include the same work that is being sung or played in a different way, a variation may be or include a different lyric, song or beat but that may be related to the original song or to the other segments to which the variation may be added by the fact that it is musically similar or creates a musically, lyrically or visually desired effect when it is combined with the other segments to which it is added. Display or output device 106 may also include a cellular phone or device and/or a touch screen.

Reference is made to FIG. 1, a conceptual illustration of a system in accordance with an embodiment of the invention. In some embodiments, system 100 may include, for example, a memory 102 such as a magnetic storage device, flash memory, RAM or other electronic storage device suitable for mass storage of data such as digital or analog audio or video data. In some embodiments, one or more segments of memory 102 may be divided or structured into a data base or other structured format that may associate one or more data entries in memory 102 with one or more other data entries in memory 102. In some embodiments, structured data may be stored or accessible by reference to for example, a mark up language such as for example, XML or other mark up languages. System 100 may also include a processor 104 such as a processor suitable for digital signal processing, encoding and decoding of large data streams and for large-scale data manipulations such as image processing. Processor 104 may include more than one processor such as for example a CPU and a video processor that may operate for example in parallel or in other configurations. System 100 may also include a display or output device 106, such as speakers or a video display, and an input device 108 such as a key-board, mouse, touch screen or other input device 108.

In operation, memory 102 may be loaded with or store two or more versions of a composition such as a song or video. For example, the system 100 may be connected to a data network such as the Internet, where the two or more versions of the composition are downloaded by a user from a content server/provider to the system 100 and stored. Alternatively and in accordance with some embodiments of the invention, a user may receive the composition on the system 100 as, e.g., streaming content. Each of the recorded and stored versions may be marked or divided into segments, where each such segment represents or is associated with a known portion of the composition. The beginning or ending markings of such segments may not be visible or audible, but may designate or set-off the start and/or end of the segment.

A user may be presented with a selection of versions of the composition, and may choose a first version that is to be played. At some point in the progression of the first chosen version, the user may select a segment of second version of the recording that is to be inserted as part of a new version of the recording that the user is creating. Processor 104 may identify the segment most closely fitting the user's selection, and may copy or insert the selected segment of the second version into the version of the composition that the user is creating. This process may be repeated until all of the segments of the recording are included in the user's new version.

The user may in this way, select a first stanza or segment of, for example, a song in an acoustic mode, a second stanza from an electric mode and a cadence from a jazz mode. In some embodiments the segments may be combined seamlessly so that beat, rhythm, pitch and other musical characteristics are retained in the movement from a segment in one mode to a segment in another mode and so that a complete, uninterrupted and seamless version of the new version is created that includes a segment from the acoustic version, a segment from the electric version and a cadence from the jazz version.

In some embodiments, segments may divide all or some of the recorded versions of a composition, such that a first segment of each of the rock, acoustic and jazz versions of a composition may include only a first stanza or other predefined portion of the composition in each of the versions. The second segment in each of the same rock, acoustic and jazz versions may include only the second stanza of the composition. Subsequent segments may include for example subsequent stanzas or verses, instrumental portions, cadences or other portions of the composition. Parallel segments in each of the versions may thereby define particular portions of the composition. For example, a fifth segment in each of the rock and acoustic versions may point to and include, e.g., the twelfth through fifteen line of the song or video that is the subject of both of the recorded versions. In some embodiments, the segment markers or set off points may be loaded into, for example, a mark-up data language such as an XML format, and the segments of many recorded versions may be associated to each other.

In some embodiments, a play speed of one or more versions of a recording may be altered so that the total duration of the various versions of the composition from which segments may be chosen, may be relatively or approximately uniform. Such alterations of play speed may be performed with tools such as ableton Live™, Cubase™ or other suitable audio recording tools.

Each of the respective first, second, third, and nth markers, break points or segment set-off points of all of the recorded versions of a particular recording will therefore uniformly point to the identical portions of the recorded work. Such uniform definition of the segments may allow the segments, when combined, to create a musically seamless or continuously flowing work without the need for a user to make further adjustments to links between the segments. For example, a user may select a first segment from a first version, a second through fourth segment from a second version and a final segment from the first version, and such segments may be combined by the processor 104 to create a seamlessly flowing version of the recording.

In some embodiments, a version may contain many or even hundreds of defined segments so that a processor 104 may locate a segment point that is close to any point in the recording even if the user did not issue a signal to switch segments at the precise timing or location of a segmentation point.

In some embodiments, a system may store the various segments (or pointers to such segments) that were selected by a user from two or more versions, and may replay the segments as a new version created by a user. In this way, users may create new versions of a known recording by assembling pieces of various versions of the recording.

Figure 2:
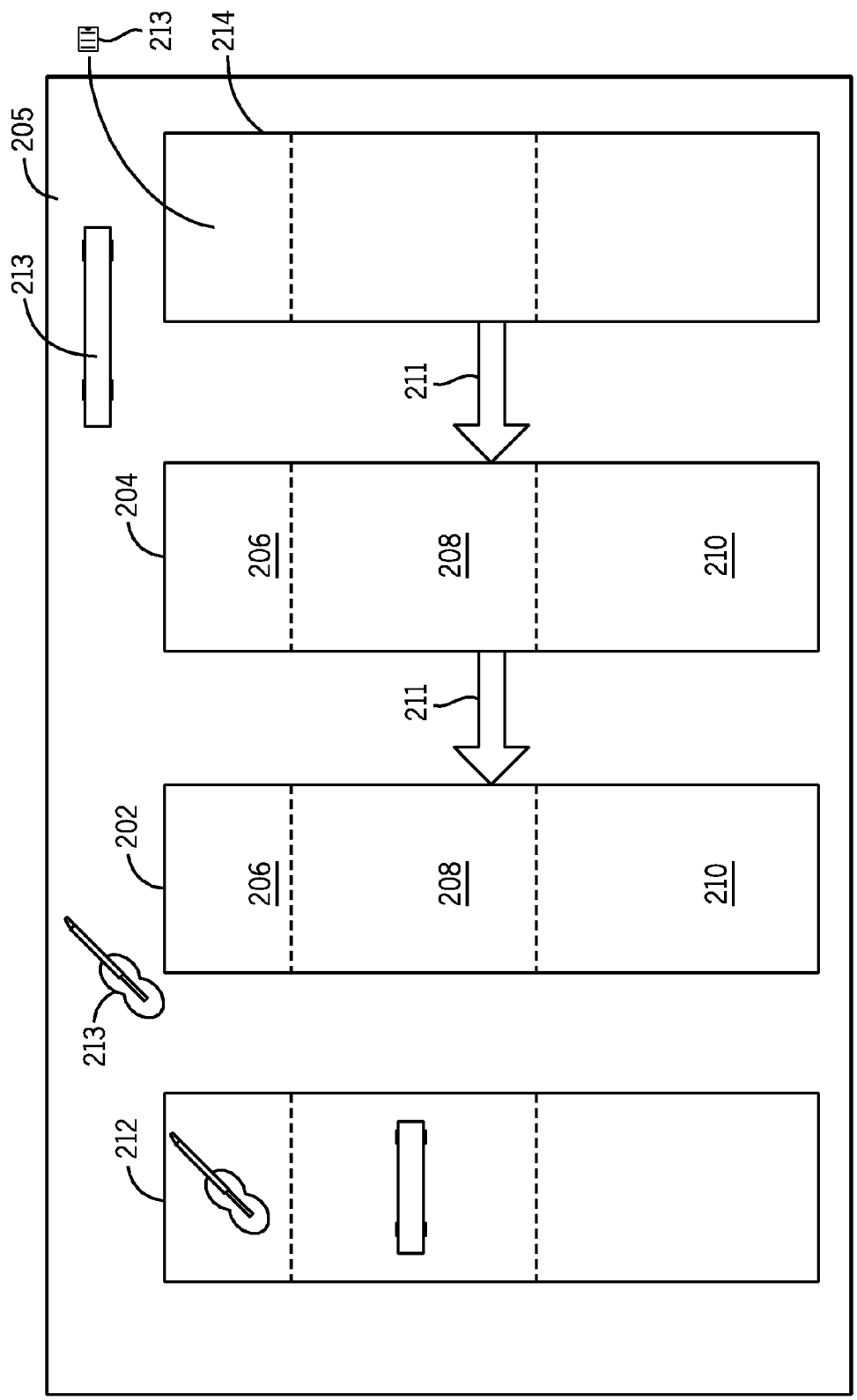
FIG. 2 is a conceptual illustration of segments of various versions of a composition and possible combinations of such segments into a created version of the composition in accordance with an embodiment of the invention.

Reference is made to FIG. 2, a conceptual illustration of a display of versions and segments of versions of a composition in accordance with an embodiment of the invention. A display may present a representation of a first version 202 and a second version 204 of a recording by way of for example a graphic user interface 205, and may indicate graphically, the mode of each of the displayed versions 202 and 204, and the location (by way of for example a graphic arrow or marker 211) in a progression of the recording of the various segments 206, 208 and 210 that are defined in the versions. For example, a particular version may be labeled with a name, icon 213 or avatar that may represent the version or the artist who performed the version.

A recording may begin to play by way of a video and/or audio output, and the display may indicate to a user the progress of the playing of the version of the recording on a display. In advance of reaching for example an end of a defined segment 208, the display may indicate an upcoming decision point wherein the user may decide which, if any, of the possible choices of segments 208 from other versions 204 may be inserted into the version that he is creating. In some embodiments, a display of a countdown may be added to indicate to the user the point on the recording by which he must make his selection during the course of the play of the then current version. In advance of the decision point, a display of the possible alternative segments 208 from versions 204 and 214 that may be selected may be provided to the user, and such display may hover and then disappear when the decision point passes or a selection of a new segment 208 has been made.

In some embodiments, if no selection of an alternative segment is made by a user, the default action may be set to continue playing the version that is then progressing. Other defaults may be used such as for example randomly altering versions at one or more segment breaks. If a selection of a segment from another version 214 is made, the graphic display may indicate the new version then being played, and may for example highlight or otherwise show the path of the various segments that have been selected for inclusion in the new version and the current version being played.

In some embodiments, the path or segments from versions that have been selected may be displayed for the user, and stored to show and retain the new version created by the user. The segments may be joined to create an original version of the recording consisting of various segments of assorted versions of the composition.

In some embodiments, a user may download, e.g., via some data network, or otherwise import into a client or other application the versions from which selections of segments may be made. In some embodiments, no such downloading may be required, and instead a reference, such as an HTML site, to segments of various versions that are stored remotely, may be presented to the user, and the user may store his newly created version by storing such references to the remotely stored versions. In some embodiments, the application may detect the bandwidth that is available on the user's computer as well as the speed of the recording, and may store or download the appropriate amount of data to facilitate smooth playback. In some embodiments, the user's created version 212 may also be stored remotely and made available to other users who may for example download version 212 to a computer or other device, use segments of such user's version 212 to create their own new versions, or other uses.

The client or application may include control functions such as for example play, pause, rewind, volume and other common controls for audio and video recording or playing.

Figure 3:
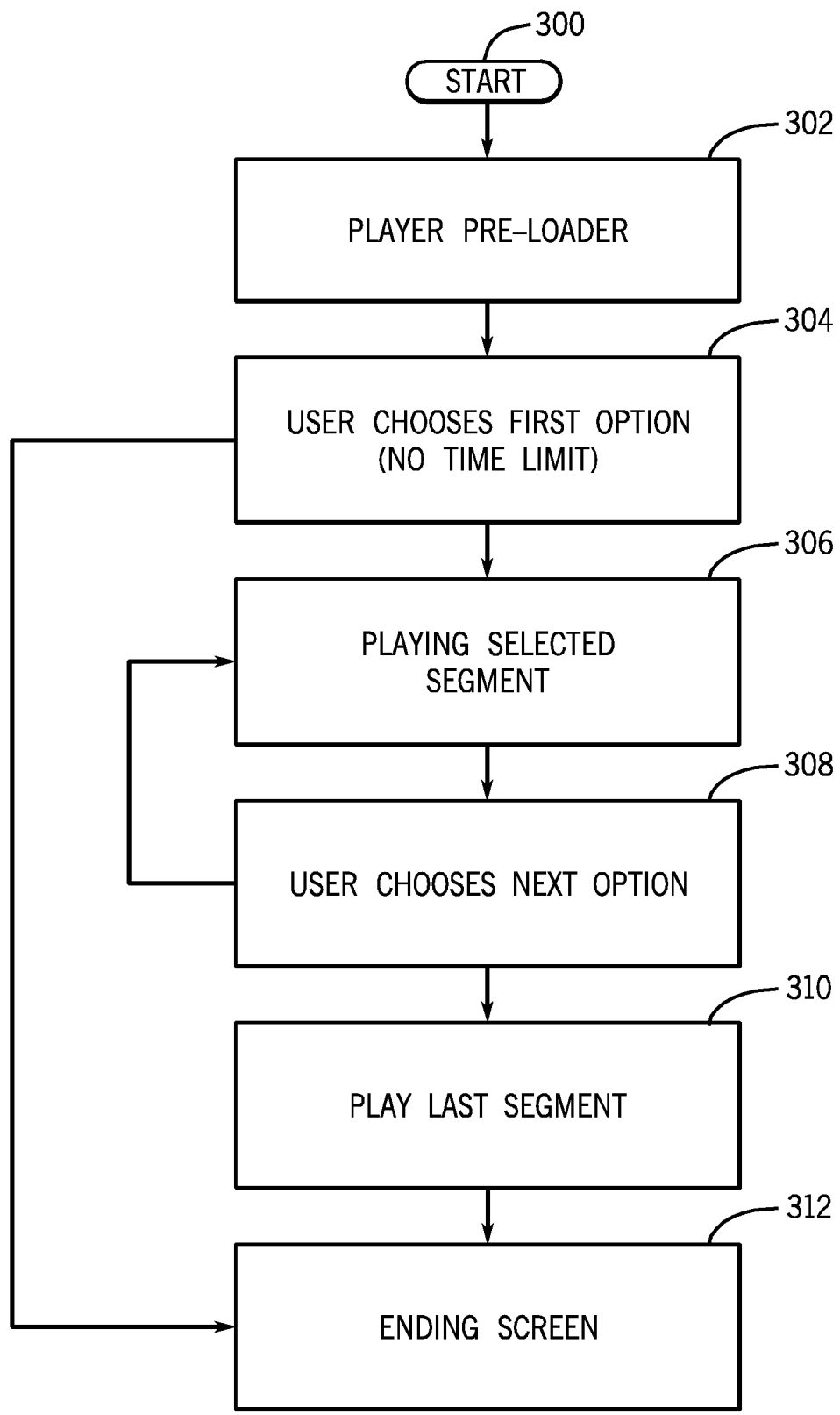
FIG. 3 is a flow diagram of a method in accordance with an embodiment of the invention.

Reference is made to FIG. 3, a flow diagram of a method in accordance with an embodiment of the invention. In block 300 a user may be presented with a start screen where for example the user may select the recording and two more versions of the recording that may be available. In some embodiments, various characteristics, data and descriptions of the recording and the version may be loaded into the application and may be displayed. In block 302, the player may be pre-loaded with at least some of, or portions of, the initial segments of the various versions of the recording, as were selected by the user. In block 304 the user may select the version for the first segment from which the recording is to begin, and the first segment of such version may become the first segment in the user's new version. In block 306, the selected segment may be played for the user, and portions of the upcoming segments that may be selected by a user at the next decision point may be pre-loaded or buffered into the application. In block 308, if the segment then being played is not the last segment of the recording, one or more versions of the subsequent segment or segments may be presented to the user for his selection. In block 310, the process of presenting and selecting segments of a recording may continue until the last segment of the recording is reached. In block 312, an ending screen may be presented to a user where the summary of the selected and assembled segments are displayed or played, and the user may be prompted to save, share, upload or otherwise use the newly created version.

Figure 4:
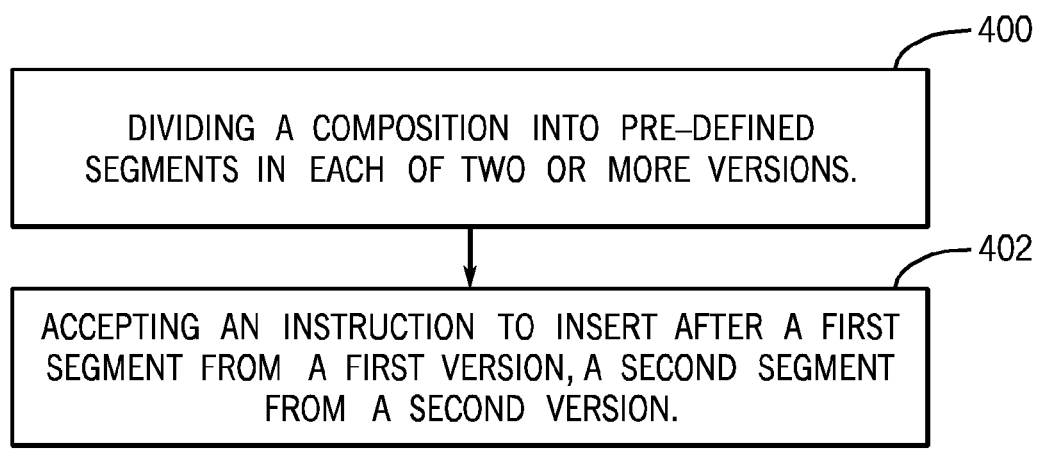
FIG. 4 is a flow diagram of a method in accordance with an embodiment of the invention.

Reference is made to FIG. 4, a flow diagram of a method in accordance with an embodiment of the invention. In block 400, there is presented an indication of versions of a composition, where each such version includes segmentation marks at each of a number of pre-defined points. In block 402, a segment from a first version is joined at one of the pre-defined points to a segment from a second version. In another block (not shown) following block 402 there is stored or recorded an indication of the joined segments from each of the versions and an indication of the segmentation point at which such segments were joined.

In some embodiments, a signal may be issued in advance of the end of segment, to alert the user that the current segment will soon be completed and that he will have an opportunity to change or alter the flow of his newly created version by substituting a segment from a different version that the one he is now using. If the user does not input a signal for such substitution, then the display may default to continue showing or playing the version then being played or may choose a random version to add to the segments that were already assembled.

In some embodiments, there may be presented to a user an indication of which segments from among the various versions are suitable for being assembled onto the version then being played. For example, at a particular point in a song, a piano instrumental may be heard, and a display may show that another version of the song includes a guitar instrumental that can break up the piano instrumental and that can be inserted after the piano instrumental. The display may also indicate than at an a cappella version of the song may not be suitable or appropriate for insertion at such point.

In some embodiments, a display may be presented that shows the origin or the various segments that have been assembled into the newly created version. For example, a graphic or icon of a guitar may be overlaid onto a first segment of the user's newly created version to show that that the source of the segment is an electric guitar version or a hip-hop mode or other version of the recording. The icon or graphic of the segment as incorporated into the newly created version may be similar to or identical with the icon or graphic of the version that was the origin of the segment. An avatar of a particular singer may be overlaid onto a second segment to show that such second segment was taken from a version performed by the particular singer.

In some embodiments, a process of assembling the various segments may include linking an end of the first segment with a start of the second segment while maintaining a musical flow of the newly created version. For example, the segments may be linked to maintain a beat, key, tone, pitch or other characteristics of one or more of the original versions.

In some embodiments, a processor may accept a signal from a user at various points in the course of the play or display of a version of the composition, even if such points are not associated with a defined break point or segmentation point. The processor may then select the closest or otherwise most suitable break point or segmentation point that can be used to alter the flow of the play to substitute the then current segment for a segment selected by the user.

In some embodiments, a processor may modify a duration of various versions of a composition so that such durations are approximately the same.

In some embodiments, one or more artists or composers may record multiple variations of one or more segments of a song or music video. For example, a segment of a love song may be recorded in the masculine, as a man singing about a woman, or in the feminine, as a woman singing about a man, such that in the first variation of a segment, the song is about "her eyes", and in the second variation of the segment the song is about "his smile". Another segment may be recorded in a first variation where a man and a woman break up and never see each other, in a second variation of the segment where the man and the woman break up but then get back together again, and in a third variation of the segment where the man and the woman break up and the woman returns to demolish the man's car. Other variations and permutations of segments may be recorded and presented to a user to create possible story lines that may be combined to weave different plots, song settings, genders or other factors in a song or video. A user may select a first segment from among the first segment variations, and combine that segment with a second segment from among the second segment variations, and may continue combining segments into a song that carries a different plot, setting, ending or one or more other factors that are unlike any of the existing songs that were recorded by the artist. All of the segment variations may be of pre-defined length or have pre-defined starting and/or ending points at which each of such segment variations may be joined with one or more other segments.

In some embodiments, a variation may be inserted at a pre-defined starting point or break point (n), but may end at one of among several subsequent pre-defined ending points (n+2, n+3, etc.), rather than at the next break point (n+1). In this way, a long variation may be added in a spot that would otherwise have been filled with a shorter variation. In some embodiments, the various segments that may be combined may not share a particular melody, duration, tempo, musical arrangement or other predefined characteristics, except for a designation by the system of a pre-defined beginning and/or end to the particular segment, and that an end to a first segment is to be followed by a beginning of one from among various second or subsequent segments.

Reference is made to FIG. 5, a conceptual diagram of numerous possible variations of a series of segments that may be constructed into a song or music video. For example, in a first segment 502, a user may be presented with two variations from which he may choose, a first variation 504 is a stanza about a lonely boy, and a second variation 506 is a stanza about a lonely girl. If a user selects segment 504 as a first segment in the construction of his song or video, then the system will limit, define or present to the user that only variations 510 through 516 in segment 2 508 are suitable to follow selected variation 504 of segment 1 502 that can follow. In FIG. 5, the suitability of variations that may follow a selected variation are shown as solid lines 501. As shown in FIG. 5, variation 518 may not be suitable to follow variation 504, and a user will therefore not be presented with variation 518 as a possible variation to follow variation 506. If a user first selects variation 504 as his selection for segment 1 502, and then selects variation 510 as his choice for segment 2 508, the system may present variations 522 to 530 to the user for possible selection as segment 3 520. This process of presentation, selection of possible variations and choice by the user may be continued until for example a variation has been selected for all of the segments. In some embodiments, a variation need not be chosen for each segment. For example, if a user chooses variation 506 for segment 1 502, and then chooses variation 518 as a selection for segment 2 508, the user may then be presented with variation 566 as a final selection for the user's song, such that the user will have selected only three segments that are to be constructed into a song or video. In some embodiments, a variation in a prior segment may be re-used or presented again as a possible choice in a subsequent segment. For example, variation 516 may be presented as a possible choice for segment 2 508, and may be presented again as a possible choice for segment 4, such that a variation may be re-used in multiple segments in a work. In some embodiments, a use of a variation 516 in segment 4 538 may be associated with different variations in segment 5 560 to account for the use of variation 516 twice or to account for the placement of variation 516 near the end of the work.

Referring to the variations presented in FIG. 5, it should be noted that various embodiments of the invention may employ smart buffering which refers to methods for loading segments for, e.g., an interactive video, such that all possible segments that may be chosen by a user are loaded by system 100, client device, encoder (as will be discussed in greater detail below), etc. That is, such segments may be loaded or may begin being loaded prior to any applicable connection/ attachment point to insure that a next or subsequent segment is ready for play/presentation. As there may be many possible segments that a user may choose, user path can be predicted, such that any segments that the user cannot reach by virtue of, e.g., choices/segments already chosen, are ignored. For example and referring to FIG. 5, variations 510, 512, 514, and 516 are possible choices for segment 2 508 if a user chooses variation 504 for segment 1 502. However, variation 518 is not a possible choice for segment 2 508 if variation 504 is chosen. Hence, variation 518 may be ignored. Additionally, after each new option/choice is made by a user, the part of a decision point/option tree or matrix that was loaded may be "trimmed" and hidden from the user. It should be noted that trimming as described herein may refer to completely ignoring a segment and/or preventing the loading thereof, even if the particular segment may already be in the process of being loaded.

In some embodiments, a user may be presented with a selection of variations for one or more segments, and may choose a first variation that is to be played or assembled. At a certain point during the segment or after the segment ends, the user may select a variation for the second segment as part of a new version of the recording that the user is creating. A processor may identify one or more segments that closely fit the user's selection and that match or are musically compatible with the then just-ended segment. The processor may assemble the selected or closely fitting segment after the then just-ended segment. This process may be repeated until some or all of the segments of the recording have been selected in the user's new version. As part of the selection process, the processor may match musical characteristics of one or more previously selected segments to the possible segments that may be selected by the user in subsequent segments. Such assistance by the processor may increase the musical quality of the assembled segments. In some embodiments, a user may be presented with the relative quality of the match between assembled segments or variations that are presented for possible assembly. For example, a processor may compare any or all of rhythm, pitch, timing or other characteristics of variations and indicate to a user which of the variations includes characteristics that would match the segments already assembled.

In some embodiments, a user may select a variation to be inserted in a segment even after the pre-defined insertion point has passed in the playing of the song 2. In such case, the variation to be inserted may be stored and played in the point designated for insertion in a next playing of the composition. In some embodiments, a selection variation may be associated with one or more next variations from which a user may select to follow the selected variation.

In some embodiments, a system may randomly select variations for insertion into some or all of the segments.

In some embodiments, segment 1 502, may not be the start of a song, video, work or recording, but may represent the first spot or space in a recorded work that is available for insertion by a user of a selected variation. For example, a user may be presented with a first stanza of Mary Had a Little Lamb, where such first stanza includes the usual lyrics. The user may be presented with several variations of a first segment, that is actually the second stanza of the work, where such variations include different music, lyrics, tempo, etc. Similarly, the user may be presented with multiple variations of a third stanza from which to choose. Finally, the system may insert a final stanza without giving the user a choice of variations from which to choose.

In another embodiment, a system may present to a user a recording of Happy Birthday, and may designate a start point for a segment that starts with the end of "Happy Birthday dear". A user may be presented with an assortment of recordings of names from which may be selected a recording of a sung name that will be inserted into the segment. The end of the inserted segment may be the end of the recorded name, and the recorded work may continue with "Happy Birthday to you". The newly created work may include the recorded first part, the selected segment, and the recorded ending.

In some embodiments, the assembled variation, or signals associated with the assembled variations may be stored. The assembled variations in the form of a newly created work may be played, stored or distributed. In some embodiments, the assembled segments may constitute a newly created musical composition.

Figure 6:
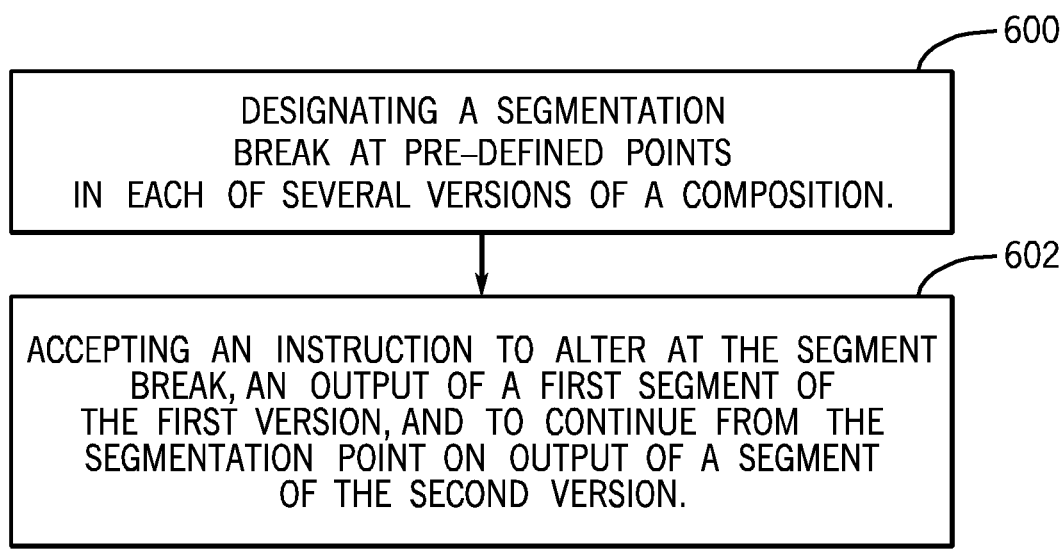
FIG. 6 is a flow diagram of a method in accordance with an embodiment of the invention.

Reference is made to FIG. 6, a flow chart of a method in accordance with an embodiment of the invention. In block 600, there may be designated a segmentation break at a pre-defined point in each of several versions of a composition. In block 602, an instruction may be accepted from, for example a user, to alter at the segmentation break, an output of a first segment of the first version, and to continue from the segmentation point an output of a segment of the second version.

Figure 7:
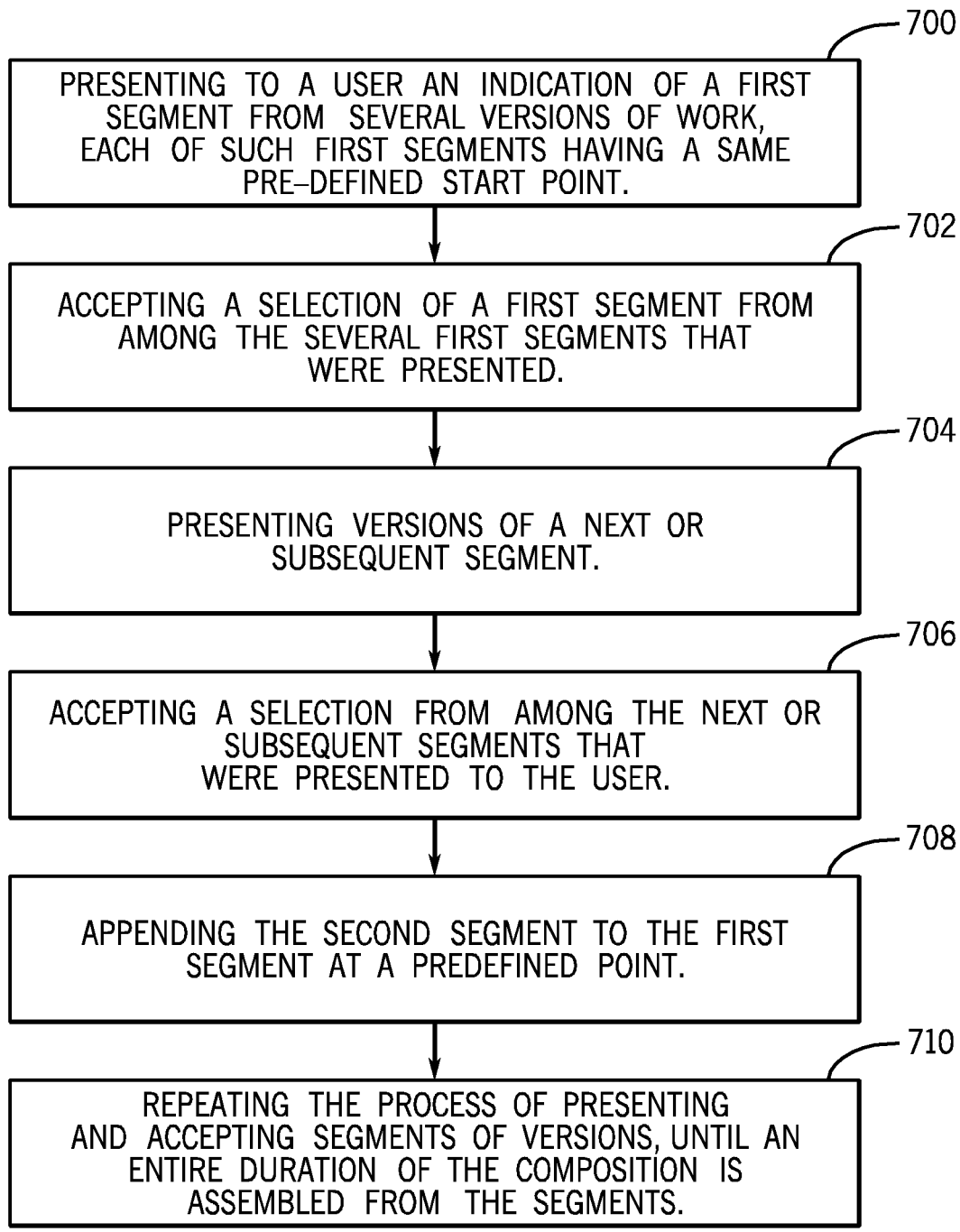
FIG. 7 is a flow diagram of a method in accordance with an embodiment of the invention.

Reference is made to FIG. 7, a flow chart of a method in accordance with an embodiment of the invention. In block 700, there may be presented to a user an indication of a first segment for several versions of a work, where each of such first segments has a same pre-defined start point. In block 702, there may be accepted from a user by for example a processor a selection of a first segment from among the several first segments that were presented from the versions. In block 704, there may be presented to for example a user several versions of a next or subsequent segment for one or more of the versions that were presented for the first segment. In block 706, there may be accepted from the user a selection from among the next or subsequent segments that were presented to the user. In block 708, the selected first segment may be appended, assembled or attached to the second segment at a predefined point so that a musical quality of the combination of the two segments is maintained. In block 710 the process of presenting segments of versions, accepting a selection of a segment and appending the selected segment to the prior segment may be repeated until an entire duration of the composition is assembled from the segments.

Figure 8:
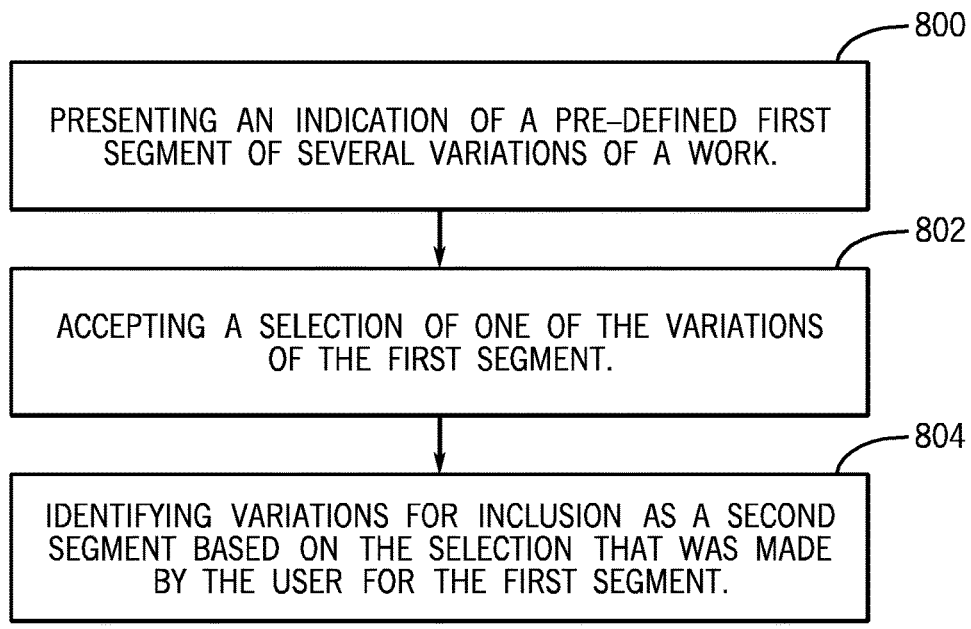
FIG. 8 is a flow diagram of a method in accordance with an embodiment of the invention.

Reference is made to FIG. 8, a flow chart of a method in accordance with an embodiment of the invention. In block 800, there may be presented to a user an indication of a pre-defined first segment of several variations of a work. In block 802, a processor may accept from for example a user a selection of one of the variations of the first segment. In block 804, the processor may select or identify several variations for inclusion as a second segment based on the selection that was made by the user for the first segment. For example, if a selected first segment is from a hip-hop version, the processor may present to the user various second segments that also have hip-hop sounds from different artists, or may include portions of different hip-hop songs from the same artist. In some embodiments, the processor may also present an indication of a relative suitability of the various presented second segments in light of the selected first segment, where from said first plurality for said first segment of said work.

Figure 9:
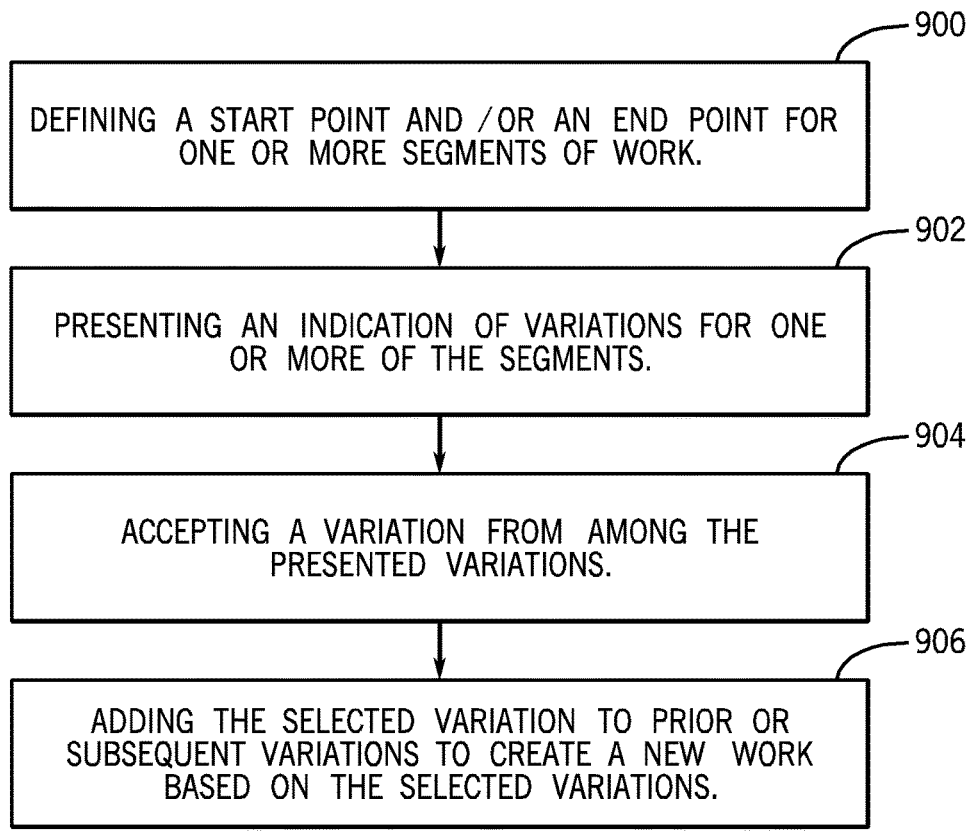
FIG. 9 is a flow diagram of a method in accordance with an embodiment of the invention.

Reference is made to FIG. 9, a flow chart of a method in accordance with an embodiment of the invention. In block 900, a start point and/or an end point for one or more segments of a work may be defined in a recording of the work. In block 902, an indication of several variations for one or more of the segments may be presented to a user. In block 904, a selection may be accepted for a variation from among the presented variations. In block 906, the selected variation may be added, combined or inserted into prior or subsequent variations to create a new work based on the selected variations.

In accordance with yet another embodiment of the invention, seamless assembly of video/audio segments is provided. To achieve such seamless assembly during streaming/online progressive download of media and/or during an interactive media, e.g., video presentation in real-time, a second segment is downloaded to a client, such as a user's personal computer or other computing device, during the presentation of a first segment. It should be noted that more than one segment may be downloaded in parallel. The first segment is then attached to the beginning of the second segment, where no jitter or gap results with the transition point either in the video or audio portion of the segments. Hence, the merged segments are presented as a seamless assembly of video/audio segments, where the user is "unaware" that the merged segments are the result of two separate or different segments.

A video format such as the Flash video format "FLV" may contain several media streams, e.g., a video stream, an audio stream, and script (i.e., cue points). Native FLV files use the MP3 audio encoding format for their audio streams. However, MP3 encoded files contain at least several milliseconds of "silence" at the beginning of each file. Hence, the FLV format cannot provide seamless assembly of multimedia content. Therefore, and in accordance with embodiments of the invention, the audio stream in the original FLV file is replaced with audio encoded in the Ogg Vorbis format, resulting in a new gapless file format hereinafter referred to as an "FOV" format, where the audio may be seamlessly interleaved and assembled.

It should be noted that the media formats described herein are merely exemplary, and that other media formats may be utilized and/or altered in accordance with embodiments of the invention to achieve similar seamless assembly of content. For example, the F4V format (based on the ISO base media file format) may be similarly altered in accordance with embodiments of the invention to provide seamless assembly of multimedia content. Additionally, formats other than Ogg Vorbis that may allow for audio to be seamlessly interleaved/assembled can also be utilized.

Figure 10:
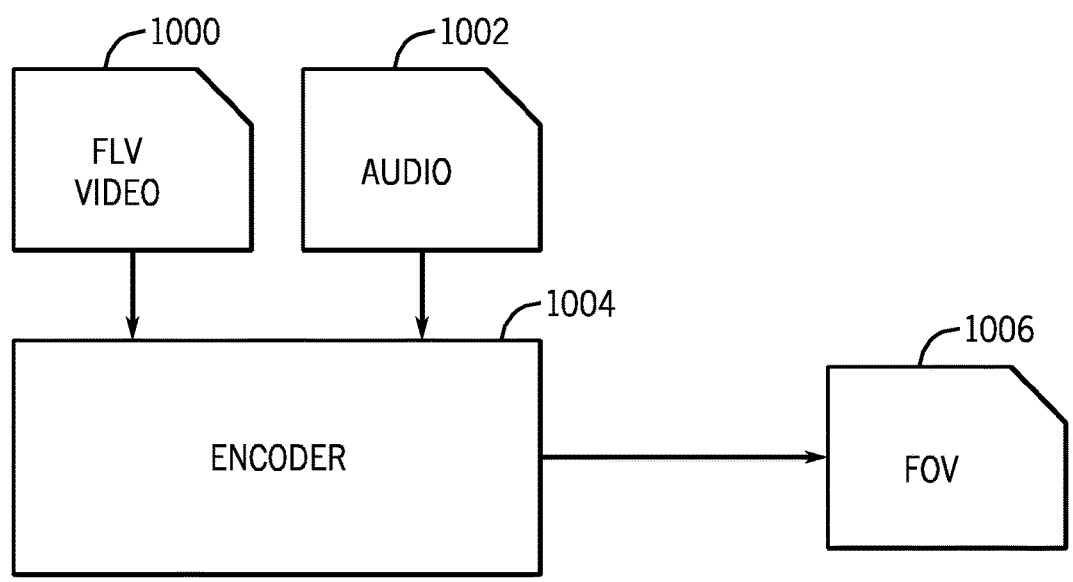
FIG. 10 is an exemplary representation of FLV file alteration utilizing an encoder in accordance with an embodiment of the invention.

Referring to FIG. 10, a representation of the FLV file alteration utilizing an encoder is shown. An FLV video stream 1000 and an audio stream 1002 are input into an encoder 1004. The encoder, as described in greater detail below, alters the original FLV video stream 1000 to output a gapless FOV video stream 1006. The encoder 1004 may be hardware, software, or a combination thereof. Additionally, the encoder 1004 may be implemented at, e.g., a content provider server, content source, or the like to provide the FOV video stream/file to a multimedia player.

Figure 11:
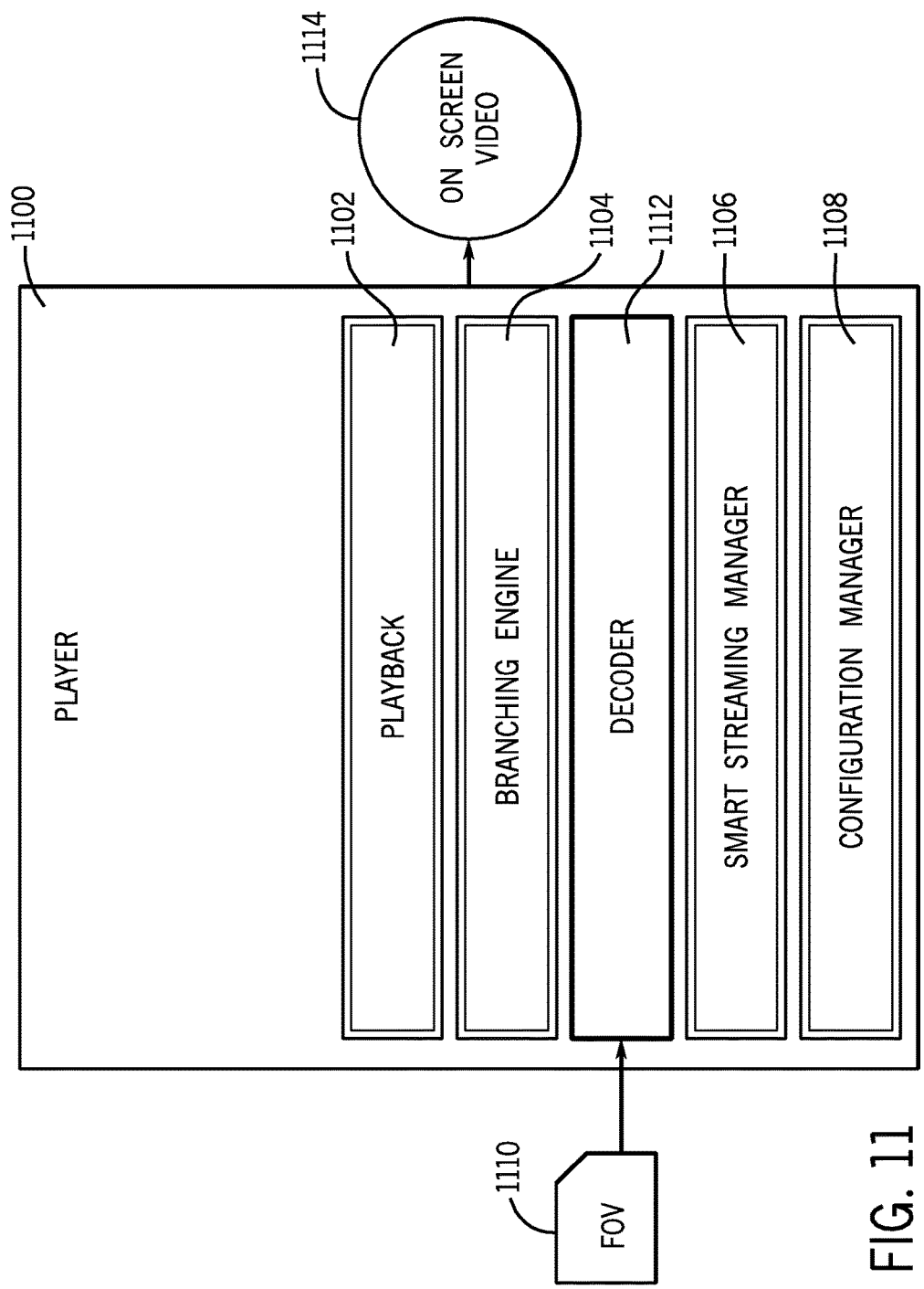
FIG. 11 is an exemplary representation of a player that may be used to present multimedia content by rendering a gapless FOV file in accordance with an embodiment of the invention.

FIG. 11 illustrates a player 1100 that may be used by a user at, e.g., a client device, such as the user's computer or other computing device for rendering a gapless FOV multimedia file. The player 1100 may be implemented as, e.g., a standalone application, having multiple functions, such as a playback function 1102, where the different video segments may be merged into a single video/audio stream, as well as a branching engine 1104 utilized to connecting user choices to appropriate video segments in real-time as discussed above. The player 1100 further may include a smart streaming manager 1106 for handling the intelligent pre-loading and runtime buffering and trimming, as well as a configuration manager 1108. The player 1100 also includes a decoder 1112, that is again, executable, for example on a client computer/machine, that decodes an incoming FOV stream 1110 to separate the video and audio streams and outputs them in a synchronized manner as an on screen video 1114. It should be noted that more or less features/elements can be included or excluded from the player 1100. For example, and as indicated above, a user may be given the ability to, e.g., pause, rewind, forward, etc., through a rendered file, such as the on screen video/interactive media.

Referring back to the encoder 1004, encoding of a gapless video stream in accordance with embodiments of the invention involves synchronized multiplexing of a video file with a new audio file and script tags. A standard FLV file container includes video tags (i.e., a complete video presentation divided into tags), audio tags (i.e., a complete audio presentation divided into tags), and script tags. Script tags are configured to hold the video metadata, i.e., scripts that connect with the player 1100 to effectuate proper presentation of the video.

Figure 12:
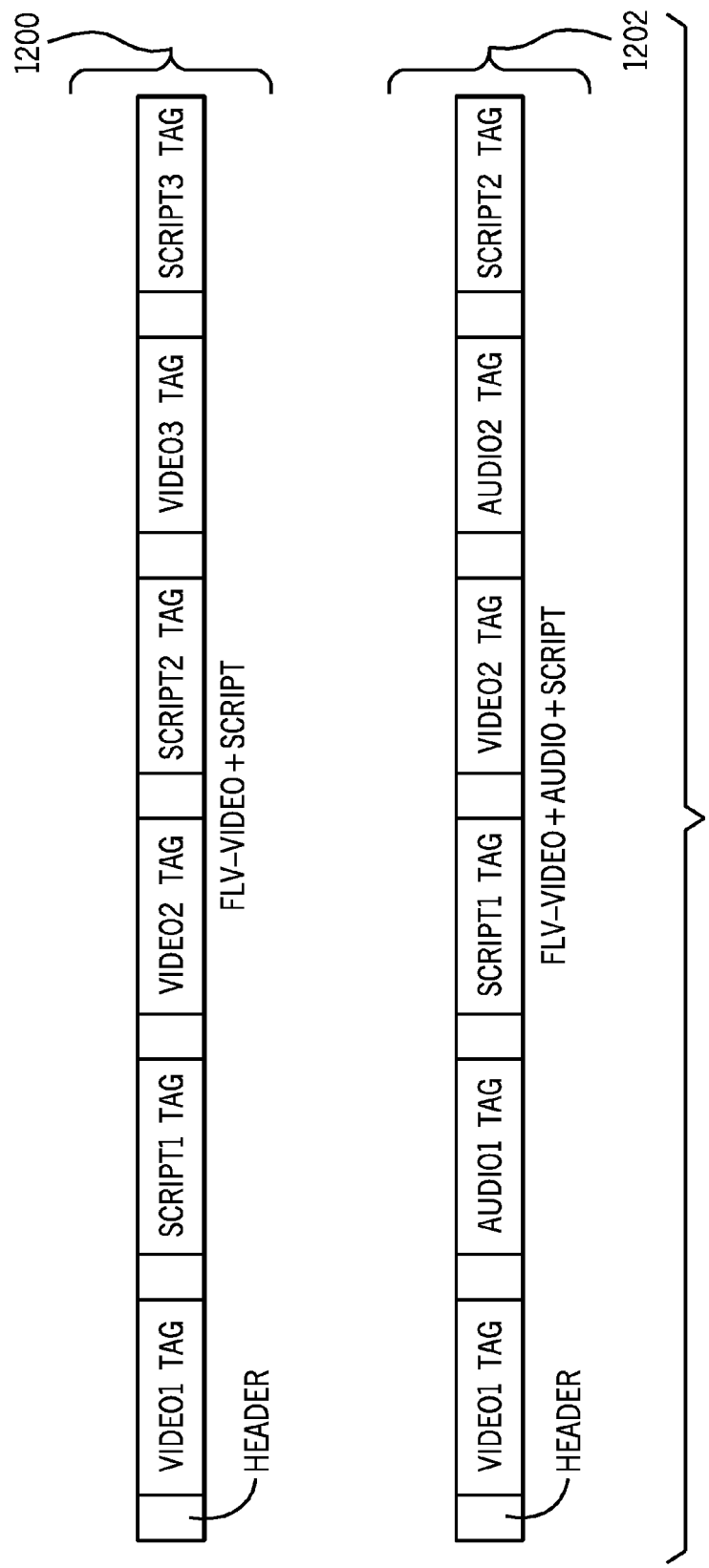
FIG. 12 is an exemplary file structure of FLV files representative of video segments.

FIG. 12 illustrates the file structure of exemplary FLV files representative of the aforementioned video segments. FLV file 1200 includes video tags and script tags, without audio tags, in addition to a header file/portion. FLV file 1202 includes video tags, script tags, a header, and the conventional audio tags, each associated with their respective video and script tags. For example, a segment may be a video segment lasting, e.g., 10-30 seconds, while a tag lasts on the order of milliseconds (depending on the video frame rate), although segments and tags may be configured to last any desired period of time suitable for the purposes of the desired content presentation. It should be further noted that the tags are part of streamed data rather than "separate" files in and of themselves. Hence, connecting two audio tags, for example, is akin to joining two parts of an audio file, rather than connecting two separate playable audio files.

To create a gapless FOV file with the encoder, an FLV file without audio/audio tags is utilized. The file structure of the FLV file is analyzed by reading the file header, video tags, and metadata to determine how to divide the associated audio stream into synchronized gapless audio tags that can be properly synchronized with the video stream (specifically, video timestamps).

Figure 13A:
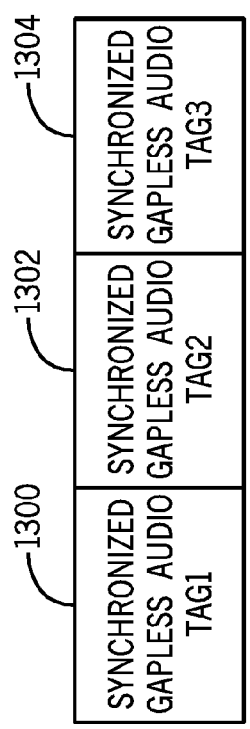
FIG. 13 is an exemplary file structure of an FOV file representative of a video segment created by an encoder in accordance with an embodiment of the invention.
Figure 13B:
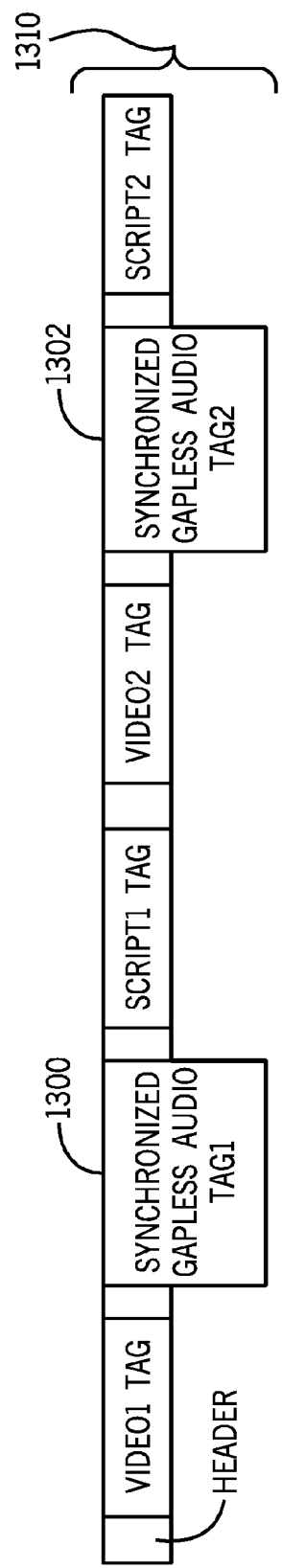

FIG. 13a illustrates a complete audio stream (e.g., the audio of a video segment) divided into 3 audio tags, 1300, 1302, and 1304. It should be noted that the audio stream structure illustrated in FIG. 13a, though not shown, may also include certain headers and small script tags of its own. FIG. 13b illustrates the file structure of an FOV file 1310 representative of a video segment, where the synchronized audio tags 1300, 1302, and 1304 have been interleaved into a timeline with the standard FLV video and script tags, effectively multiplexing the FLV and Ogg Vorbis files. Hereafter, different video segments may be combined as described above, where the combined video segments experience no gap or jitter between the transition from one video segment to another. It should be noted that the order of the video tags, synchronized gapless audio tags, and script tags is not necessarily constant as illustrated in the exemplary FOV file 1310. That is, the various tags can be encoded in any order so long as the appropriate streaming for all of the tag types is maintained.

In accordance with certain embodiments of the invention, the encoder creates an FOV file for each video segment that is/may be presented or played. Each of the FOV files has a file header and tags as illustrated in, e.g., FIG. 13b. Additionally and as also described above, complete gapless audio, e.g., the Ogg Vorbis-encoded audio associated with the video, is divided into synchronized gapless audio tags that can be synchronized with video timestamps such that if an FOV file is stopped/cut at any point within its file structure, both the audio and video streams will reach the same or at least approximately the same point on the playback/presentation timeline.

Figure 14:
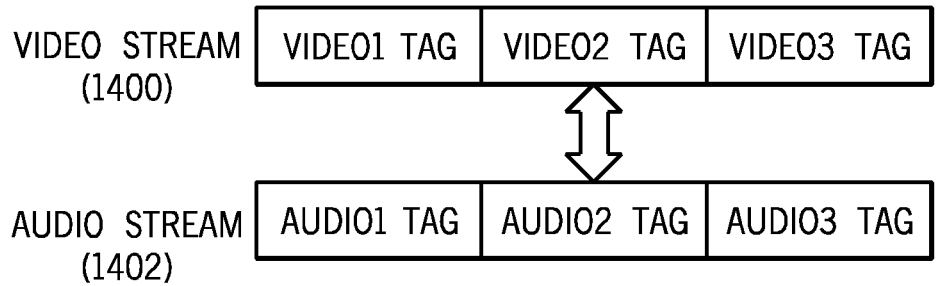
FIG. 14 is an exemplary representation of a video stream and audio stream synchronization via a decoder in accordance with an embodiment of the invention.

To playback/present an encoded FOV file, a decoder, such as decoder 1112 described above, is utilized to translate the FOV formatted file into playable video and audio streams. It should be noted that a standard, e.g., Flash, player, will not be able to playback/present the FOV file as the multiplexing performed to create the FOV file makes it incompatible with players without the use of the decoder. The decoder in accordance with embodiments of the invention synchronizes the video and audio streams received to play seamless and sequential video segments. As illustrated in FIG. 14, the video stream 1400, with its component video tags Video1 tag, Video2 tag, Video3 tag, etc. is synchronized with their respective audio tags, Audio1 tag, Audio2 tag, Audio3 tag, etc.

Figure 15:
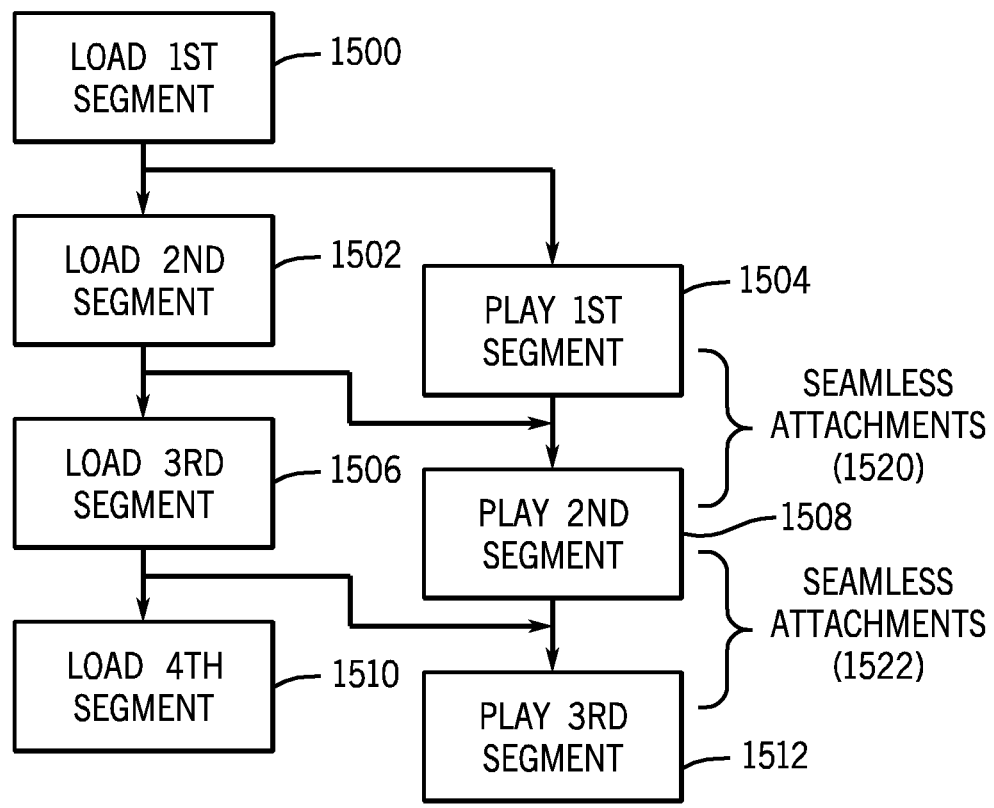
FIG. 15 is an exemplary flow diagram illustrating the playback of sequential video segments in accordance with an embodiment of the invention.

FIG. 15 is representative of an exemplary flow diagram illustrating the playback of sequential video segments. At step 1500, a first segment is loaded. At step 1502 a second segment is loaded while the first segment is played at step 1504. At step 1506, a third segment is loaded while the second segment is being played at step 1508. At step 1510, a fourth segment may be loaded while at step 1512, the third segment is played. That is, subsequent segments may be loaded in parallel/at least partly in conjunction with the playback of previous segments. As also shown, seamless attachments 1520 and 1522 are made between the various segments upon playback by virtue of the FOV file structure and synchronized gapless audio tags utilized therein to effectuate continuous playback.

Figure 16:
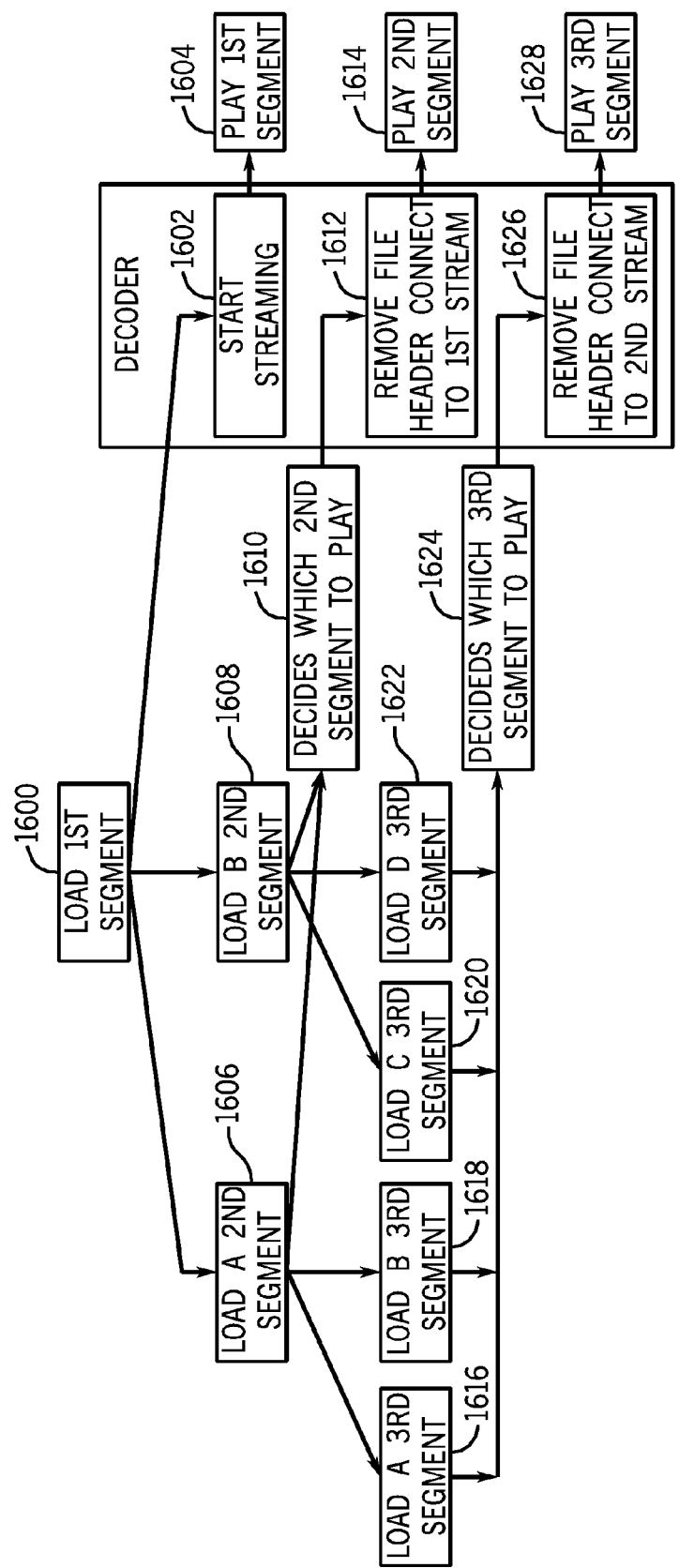
FIG. 16 is an exemplary flow diagram illustrating the playback of sequential video segments during an interactive video session in accordance with an embodiment of the invention.

FIG. 16 is an exemplary flow diagram illustrating the playback of video segments in the context of an interactive video as described previously and in accordance with some embodiments of the invention. At step 1600, a first video segment may be loaded. At step 1602, the decoder starts streaming the loaded first video segment, and at step 1604, the first video segment is played. At steps 1606 and 1608, alternate second video segments are loaded, such that a user may choose at step 1610, which of the alternate second video segments is to be sequentially played after the first video segment. Upon a choice to play either of the second video segments, the decoder removes the FOV file header of the chosen second video segment and attaches this video segment to the first video segment seamlessly. Additionally, the decoder changes headers of the actual tags (e.g., video and audio tags), so that the tags will "appear" at the correct time in the video timeline, and the player layer (which plays the video stream) will see two video segments as a single stream. At step 1614, this second video segment is played without any jitter/gap as would conventionally be experienced. At steps 1616, 1618, 1620, and 1622, alternate third video segments are loaded. As before, at step 1624, one of the alternate third video segments is chosen for playback and at step 1628, the decoder removes the FOV file header of the chosen third video segment and seamlessly connected to the second video segment being streamed. At step 1628, the third video segment may be played. As described above, the seamlessly assembled video segments may, in addition to being played, be rewound through, forwarded through, paused, etc.

In accordance with yet another embodiment, seamless assembly of video/audio segments as previously described may also be implemented in the context of wireless devices, such as cellular telephones, mobile tablet PCs, etc., for example, utilizing the Apple®/Cisco® iOS® platform/software. However and in contrast to the seamless assembly described above, which may occur during progressive media download, files may be downloaded completely prior to real-time decoding.

Various embodiments are described herein with reference to drawings. These drawings illustrate certain details of specific embodiments that implement the systems and methods and programs of the present invention. However, describing the invention with drawings should not be construed as imposing on the invention any limitations that may be present in the drawings. Various embodiments contemplate methods, systems and program products on any machine-readable media for accomplishing its operations. The embodiments of the present invention may be implemented using an existing computer processor, or by a special purpose computer processor incorporated for this or another purpose or by a hardwired system.

As noted above, various embodiments include computer program products embodied or encoded on, e.g., a non-transitory computer/machine-readable media (e.g., memory) for carrying or having machine-executable instructions or data structures stored thereon. Such computer/machine-readable media can be any available media which can be accessed by a general purpose or special purpose computer, server, or other machine with a processor or controller. By way of example, such computer/machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures. When information is transferred or provided over a network or another communications connection (either hardwired, wireless, or a combination of hardwired or wireless) to a machine, the machine properly views the connection as, e.g., a transitory computer/machine-readable medium. Combinations of the above are also included within the scope of computer/machine-readable media. Machine-executable instructions comprise, for example, instructions and data which cause a general purpose computer, special purpose computer, or special purpose processing machines to perform a certain function or group of functions.

Various embodiments are also described in the general context of method processes which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing processes of the methods disclosed herein. The particular sequence of such executable instructions or associated data structures represent examples of corresponding acts for implementing the functions described in such processes and it is understood that the order of these processes may differ from what is depicted. Also, two or more processes may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching processes, correlation processes, comparison processes and decision processes. It should also be noted that the words "component" and "module" as used herein and/or in the claims is intended to encompass implementations using one or more lines of software code, and/or hardware implementations, and/or equipment for receiving manual inputs.

Various embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, handheld devices, multi-processor systems, microprocessor-based or programmable consumer electronics, network PCs, minicomputers, mainframe computers, and the like. Embodiments of the present application may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The foregoing description of embodiments of the invention has been presented for purposes of illustration and description. It is not intended to be exhaustive or to limit the invention to the precise form disclosed. The embodiments were chosen and described in order to explain the principals of the invention and its practical application to enable one skilled in the art to utilize the invention in various embodiments and with various modifications as are suited to the particular use contemplated. Other substitutions, modifications, changes and omissions may be made in the design, operating conditions and arrangements of the preferred and other exemplary embodiments without departing from the spirit of the present invention.

What is claimed is:

1. A system for seamless media assembly, comprising:
at least one processing unit;
at least one memory storing data representing a plurality of predefined composition paths, each path comprising a plurality of gapless media files, each gapless media file representing a predefined portion of one or more of the predefined composition paths and including a predefined decision period during which a user may select, in real-time as the respective gapless media file is playing, a subsequent gapless media file to be played automatically and immediately following a conclusion of the respective gapless media file, wherein the decision period of the respective gapless media file begins subsequent to a beginning of the respective gapless media file and ends prior to the conclusion of the respective gapless media file; and
at least one memory storing computer-executable instructions that, when executed by the at least one processing unit, provide:
an encoder located at a remote server and a decoder located at a client device, wherein the remote server and client device communicate over a network,
wherein the encoder is configured to:
create first and second gapless media files by interleaving first and second pluralities of gapless audio segments representative of first and second audio streams with first and second video segments, respectively;
create an alternative second gapless media file by interleaving alternative second pluralities of gapless audio segments representative of an alternative second audio stream, with an alternative second video segment; and
transmit over the network, at least in part, metadata and content of the first, second, and alternative second gapless media files to the decoder located at the client device, wherein the metadata and content of the second gapless media file are simultaneously transmitted over the network to the decoder at least in part with the metadata and content of the alternative second gapless media file during playback of the first gapless media file at the client device; and
wherein the decoder is for creating a seamlessly continuous media stream comprising one of the composition paths, the decoder configured to:
receive over the network, at least in part, from the encoder located at the remote server, the metadata and content of the first, second, and alternative second gapless media files, wherein the metadata and content of the second gapless media file are simultaneously received over the network from the encoder at least in part with the metadata and content of the alternative second gapless media file during playback of the first gapless media file at the client device;
upon a selection of the second gapless media file instead of the alternative second gapless media file:
discontinue receiving over the network the metadata and content of the alternative second gapless media file;
synchronize the first and second audio streams with the first and second video segments, respectively; and
assemble the first and second gapless media files into the seamlessly continuous media stream for playback; and
upon a selection of the alternative second gapless media file instead of the second gapless media file:
discontinue receiving over the network the metadata and content of the second gapless media file;
synchronize the first and alternative second audio streams with the first and alternative second video segments, respectively; and
assemble the first and alternative second gapless media files into the seamlessly continuous media stream for playback.

2. The system of claim 1, wherein the first and second audio streams are encoded in an Ogg Vorbis format.

3. The system of claim 1, wherein the first and second video segments are encoded in a Flash video format.

4. The system of claim 1, wherein the first and second video segments comprise video tags and script tags.

5. The system of claim 1, wherein the decoder is further configured to remove respective headers from the first and second gapless media files prior to assembly of the first and second gapless media files.

6. The system of claim 1, wherein the decoder is further configured to alter respective headers of the first and second pluralities of gapless audio segments prior to assembly of the first and second gapless media files to effectuate the playback of the first and second audio streams at appropriate points in time.

7. The system of claim 1, wherein the encoder is further configured to, prior to creating the first and second gapless media files, analyze the first and second audio streams to determine proper division points resulting in the first and second pluralities of gapless audio segments such that the first and second pluralities of gapless audio segments will be synchronized with first and second pluralities of video tags comprising the first and second video segments.

8. The system of claim 1, wherein the seamless media assembly is performed during one of a progressive download or subsequent to a complete download of the first and second gapless media files at a mobile device, and wherein the decoder operates in real-time.

9. A computer-implemented method, comprising:
storing data representing a plurality of predefined composition paths, each path comprising a plurality of gapless media files, each gapless media file representing a predefined portion of one or more of the predefined composition paths and including a predefined decision period during which a user may select, in real-time as the respective gapless media file is playing, a subsequent gapless media file to be played automatically and immediately following a conclusion of the respective gapless media file, wherein the decision period of the respective gapless media file begins subsequent to a beginning of the respective gapless media file and ends prior to the conclusion of the respective gapless media file;
analyzing, at an encoder located at a remote server, first and second audio streams to determine proper division points resulting in first and second pluralities of gapless audio segments;
creating, with the encoder, first and second gapless media files for seamless assembly by interleaving the first and second pluralities of gapless audio segments representative of the first and second audio streams, with first and second video segments, respectively;

creating, with the encoder, an alternative second gapless media file for seamless assembly with the first gapless media file by interleaving alternative second pluralities of gapless audio segments representative of an alternative second audio stream, with an alternative second video segment;

transmitting over a network, at least in part, by the encoder, metadata and content of the first, second, and alternative second gapless media files to a decoder located at a client device, wherein the metadata and content of the second gapless media file are simultaneously transmitted over the network to the decoder at least in part with the metadata and content of the alternative second gapless media file during playback of the first gapless media file at the client device;

receiving over the network, at least in part, from the encoder located at the remote server, metadata and content of the first, second, and alternative second gapless media files at the decoder, wherein the decoder is configured to create a seamlessly continuous media stream comprising one of the composition paths, wherein the metadata and content of the second gapless media file are simultaneously received over the network from the encoder at least in part with the metadata and content of the alternative second gapless media file during playback of the first gapless media file at the client device;

if a selection of the second gapless media file instead of the alternative second gapless media file is received:
  discontinuing receiving over the network the metadata and content of the alternative second gapless media file;
  synchronizing, by the decoder, the first and second audio streams with the first and second video segments, respectively; and
  assembling, by the decoder, the first and second gapless media files into the seamlessly continuous media stream for playback; and if a selection of the alternative second gapless media file instead of the second gapless media file is received:
  discontinuing receiving over the network the metadata and content of the second gapless media file;
  synchronizing, by the decoder, first and alternative second audio streams with first and alternative second video segments, respectively; and
  assembling, by the decoder, the first and alternative second gapless media files into the seamlessly continuous media stream for playback.

10. The computer-implemented method of claim 9, wherein the first and second audio streams are encoded in an Ogg Vorbis format.

11. The computer-implemented method of claim 9, wherein the first and second video segments are encoded in a Flash video format.

12. The computer-implemented method of claim 9, wherein the first and second video segments comprise video tags and script tags.

13. The computer-implemented method of claim 9, wherein the synchronizing of the first and second audio streams and the assembling of the first and second gapless media files occurs during one of a progressive download or in real-time subsequent to a complete download of the first and second gapless media files at a mobile device.

* * * * *